United States Patent [19]

Petersen

[11] 4,409,505

[45] Oct. 11, 1983

[54] ELECTRIC MOTOR HAVING IMPROVED OPERATING CHARACTERISTICS

[75] Inventor: Christian C. Petersen, Westwood, Mass.

[73] Assignee: Polaroid Corporation, Cambridge, Mass.

[21] Appl. No.: 263,975

[22] Filed: May 15, 1981

[51] Int. Cl.³ .............................................. H02K 5/14
[52] U.S. Cl. ............................ 310/90; 310/40 MM; 310/228
[58] Field of Search ................... 310/40 MM, 90, 228, 310/248, 251; 308/238, 241, DIG. 7

[56] References Cited

U.S. PATENT DOCUMENTS

| Re. 10,816 | 3/1887 | Snowberger ..................... 310/228 |
| 1,733,931 | 10/1929 | Arnold . |
| 2,157,752 | 5/1939 | Freistadter . |
| 2,465,446 | 3/1949 | Gorfin et al. ....................... 310/46 |
| 2,503,021 | 4/1950 | Bennett . |
| 2,555,997 | 6/1951 | Portail ............................ 310/228 X |
| 3,303,370 | 2/1967 | Boes et al. ........................ 310/228 |
| 3,979,762 | 9/1976 | Hendry et al. ...................... 354/288 |
| 3,982,146 | 9/1976 | Hokky ............................. 310/90 X |
| 4,055,370 | 10/1977 | Cunningham ..................... 310/90 X |
| 4,119,875 | 10/1978 | Naguchi ......................... 310/228 X |
| 4,127,785 | 11/1978 | Noguchi .................. 310/40 MM X |
| 4,227,104 | 10/1980 | Hamman .......................... 310/90 X |
| 4,228,376 | 10/1980 | Mabuchi ........................ 310/248 X |
| 4,274,684 | 6/1981 | Richfield ......................... 308/238 X |

Primary Examiner—John Gonzales
Attorney, Agent, or Firm—David R. Thornton

[57] ABSTRACT

An economical, miniature electric motor exhibiting improved efficiency and in-specification, first-use performance after substantial periods of non-use, which is especially suited for operating the film eject mechanism of a self-developing camera, includes single piece, base metal brushes, a plain bore armature bearing in the commutator end cap, and a fibrous wicking material containing a supply of commutation enhancing lubricant bearing against the commutator to provide a supply of the lubricant thereto which minimizes brush friction while enhancing electrical conduction therebetween. Additionally, migration of the commutator lubricant along the rotor shaft into the plain bore journal in the motor end cap is encouraged to provide a supply of surface lubricant for the journal.

6 Claims, 4 Drawing Figures

ELECTRIC MOTOR HAVING IMPROVED OPERATING CHARACTERISTICS

BACKGROUND OF THE INVENTION

The present invention relates to electric motors and, more particularly, to commutator/brush electric motors of the type used in photographic camera applications.

Miniature electric motors have found wide-spread application in many consumer products including self-developing photographic cameras (such as the PRONTO! camera) that are loaded with a plurality of self-developing film units contained within a film pack. In these types of cameras, a miniature, battery operated electric motor is employed to drive the film eject mechanism for a carefully determined period, usually 1.5 seconds, to eject each film unit after exposure. The motor typically drives a multiple pass, step-down gear train that is connected to and rotates pressure applying rollers so that the exposed film unit passes between and through the rollers as it is ejected from the camera. Motor efficiency is vital to reduce battery drain, while reliability and long life are also necessary. Further, it is an operational requirement of the drive motor that the film unit be ejected within a narrowly specified rate to permit uniform development. Hence, out of specification drive motor performance, including out of specification start-up torque and run speed, can impair the quality of the developed film unit.

Electric motors typically used in the above-described application include a permanent magnet stator and a rotor assembly supported for rotation by bearings mounted in the motor end caps. The rotor assembly includes an armature stack and a plurality of armature coils wound on the armature stack. A multi-bar commutator is mounted on the rotor shaft adjacent one end of the armature stack with the individual commutator bars electrically connected to the armature coils to define a complete armature circuit.

A brush assembly is usually mounted in the stator with brushes resiliently contacting the commutator to effect commutation. Each brush typically is a multi-element structure including a resilient cantilevered beam fabricated from, for example, beryllium copper, phosphur bronze, and/or nickel copper alloys carrying a brush contact secured to one end so as to be resiliently biased against the commutator. Typically, the brush contact contains precious metal such as silver, for example silver graphite or the like, designed to effect optimum electrical contact with the commutator bars during commutation.

The rotor shaft is usually mounted in sleeve bearings formed of sintered bronze impregnated with bearing oil. Typical bearing oils, while providing extended bearing life, can cause commutation problems if they migrate to the commutator/brush interface since they would deposit an oil film at the brush/commutator interface which is transformed into a solid carbonaceous deposit that is a high impedance film which degrades commutation when the oil is exposed to the electric field between the commutator and the brush contact and the make-break sparking or brush fire that occurs during commutation. Also, any bearing oil absorbed into the brush contact structure can also adversely affect performance. An electric motor having its commutator and brushes contaminated in this manner can exhibit uneven start-up torque and run speed characteristics. In order to minimize the migration of the bearing oil from the shaft bearing to the commutator, it has been a standard practice in the industry to position a washer on the rotor shaft between the commutator and the support bearing to serve as an oil slinger, when the motor is in operation, to throw off any oil that may have migrated to the slinger from the bearing. The slinger functions as a dynamic barrier in that it is operational only when the rotor is rotating.

The aforesaid motor design has proven satisfactory as the drive motor in the film unit ejection mechanism of self-developing cameras although its design does present some problems since, like all cameras, operating conditions can vary from near continuous use on a daily basis to a single exposure use between substantial periods of non-use. In substantial periods of non-use, often lasting several months or more, bearing oil can migrate from the bearing/shaft interface. As a result, the bearing interface from which the oil migrated can be left with insufficient surface oil for optimum lubrication at start-up, and the aforedescribed oil on the commutator and oil in the brush contacts condition can be present. During the next period of camera operation, the motor performance, including start-up torque and run speed, can deteriorate and, as can be appreciated, degraded motor performance can result in uneven passage of the exposed film unit through the pressure applying rollers and less than optimum image development.

As can be also appreciated from the foregoing, there is a substantial need in camera applications for a miniature, economical electric motor of high efficiency to reduce battery drain, and high reliability to exhibit long life and in-specification, first-time performance after substantial periods of non-use.

SUMMARY OF THE INVENTION

In view of the above, the primary object of the present invention is to provide a miniature electric motor of improved efficiency, long life, and in-specification operating characteristics the first time it is used after substantial periods of non-use and which is especially suited for use in photographic cameras. Another object of the present invention is to provide an electric motor of lowered brush impedance and one in which the long-known need for an oil slinger between the oil sensitive commutator and the adjacent rotor support bearing is also obviated and, further, to provide an electric motor that fulfills the objects above which is less expensive to manufacture than prior motors.

In accordance with these objects and others, the present invention provides a miniature electric motor having unitary, base metal commutator brushes employed in conjunction with a synthetic, non-carbon-forming lubricant. The lubricant is also utilized for lubricating a simple bearing located in the commutator end cap. The motor armature and its associated commutator are mounted on a rotor shaft which extends into a plain-bore bearing located in the plastic end cap of the motor. Commutation is effected by unitary, one-piece cantilevered base metal brushes and a wicking element that contains a supply of the commutation enhancing lubricant is placed in direct contact with the commutator. The commutator lubricant is encouraged to migrate from the commutator along the rotor shaft to the plain-bore journal to provide shaft lubrication. The lubricant eliminates the need for precious metal, multi-piece electrodes while the desired migration of the commutator lubricant to the plain-bore journal provides a supply of surface lubrication to assure in-specification first-use performance after substantial periods of non-use, and eliminates the need for the relatively costly impregnated shaft bearing as well as the oil slinger. The single piece electrode and the reduction in components permits the fabrication of an electric motor that provides high efficiency with consistent in-specification first-time performance after substantial periods of non-use at a lower cost than prior motors.

DESCRIPTION OF THE PREFERRED EMBODIMENT

Figure 1:
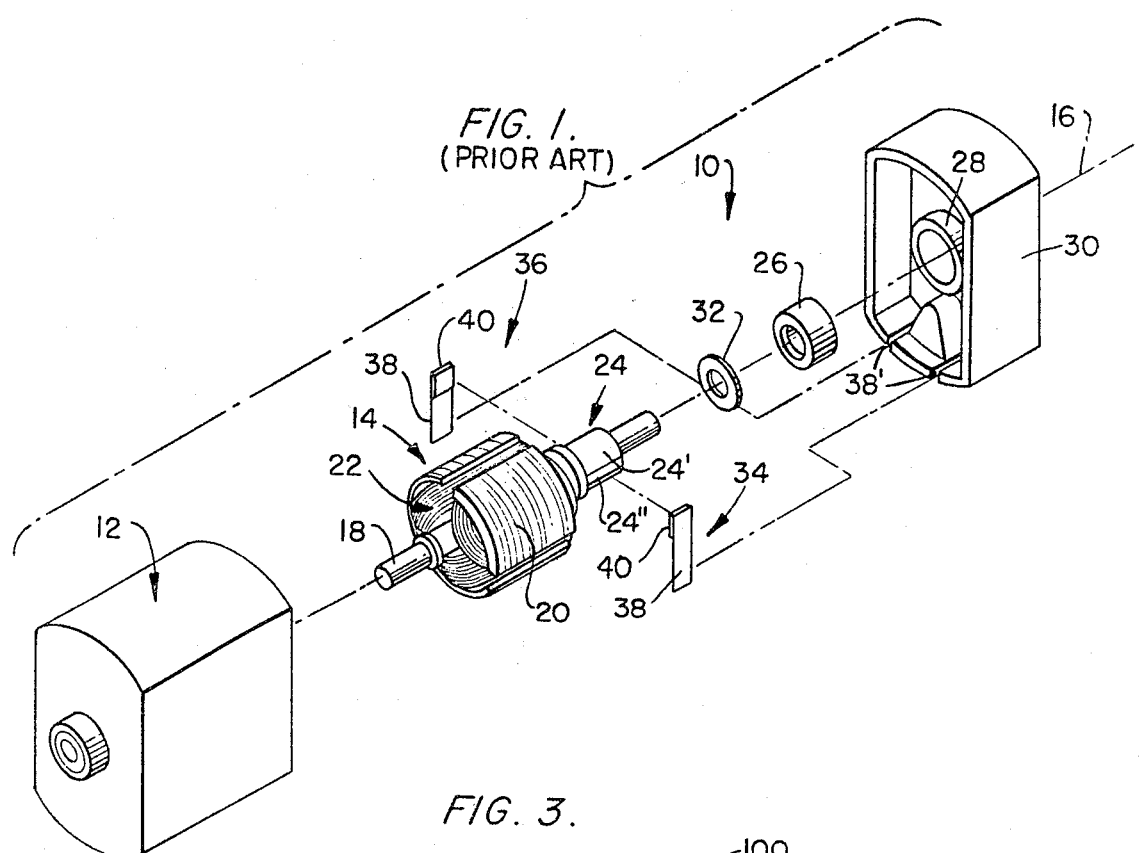
FIG. 1 is a partial exploded perspective view of a prior electric motor assembly.

A partial exploded perspective view of a conventional electric motor that has been used as the drive source for the mechanism that ejects exposed film units from the film pack of a self-developing camera is shown in FIG. 1 and generally referred to therein by the reference character 10. A further understanding of the film eject mechanism environment may be had by reference to U.S. Pat. No. 3,979,762, the disclosure of which is incorporated herein by reference to the extent necessary to practice the present invention. The motor 10 includes a stator assembly 12 that typically includes two permanent field magents (not shown) that establish a field and a rotor assembly 14 that is mounted within the stator 12 for rotation about a motor axis 16.

The rotor assembly 14 includes a support shaft 18, a laminated armature stack 20, armature coils or windings 22 wound on the stack 20, and a commutator 24 connected to the armature coils. In the embodiment shown, the rotor is a three pole rotor and has three associated armature windings connected to three commutator bars with commutator bars 24' and 24" partially shown in FIG. 1. The commutator end of the support shaft 18 is journalled in a porous oil-containing sleeve bearing 26 that is received with an appropriately sized bore 28 in the motor end cap 30. A slinger washer 32 is mounted on the rotor shaft 18 intermediate the commutator 24 and the support bearing 26.

Multiple-element brushes 34 and 36 are provided to effect commutation with the commutator 24. Each brush 34 and 36 includes resilient spring arms 38 received and secured at their proximate end in retaining slots 38' with contact blocks 40 of precious metal secured to the distal or remote end of the spring arms. The contact blocks 40 are designed to be resiliently urged against the commutator 24 in a conventional manner to effect commutation.

The bearing 26 is typically fabricated from a sintered bronze material having a pore structure that contains a fluid bearing oil such as an organic oil. The oil at the bearing/shaft interface provides immediate surface lubrication while the remaining oil in the pore structure of the bearing 26 functions as an oil reserve to replenish depleted or lost surface oil. The bearing oil, as is characteristic of this material, can migrate from the bearing 26 along the shaft 18 to the oil slinger 32 and then toward the commutator 24. When the electric motor 10 is subject to frequent operation, the oil slinger 32 functions to sling migrated oil away from the commutator 24 and prevent further migration. In addition, frequent motor operation can assist in driving additional bearing oil from the bearing pore structure to replenish any surface oil that has migrated from the bearing 26. However, when the electric motor 10 is not used for substantial periods of time, oil can migrate across the slinger 32 toward and onto the commutator 24. Should the oil reach the commutator 24, it can degrade into a high impedance film that interferes with commutation and can be absorbed into the contact blocks 40. When the motor is next operated, its performance in terms of starting torque and run speed can be out-of-specification since the bearing/shaft interface may be in an oil poor state (since surface oil has migrated from the interface), or because of the presence of the oil film at the commutator/brush interface and the transformation of this oil into a carbonaceous deposit that further impedes efficient commutation. The deposits can, of course, accumulate with successive periods of non-use and use. The above-described motor is designed to nominally operate at a load of 0.2 in/oz of torque and at a run speed of between 10,500 and 12,500 rpm. When the commutator is subject to the above-described bearing oil contamination, the motor rpm will drop below the lower limit to undesirably increase the transit time of the exposed film unit through the pressure applying rollers.

Figure 3:
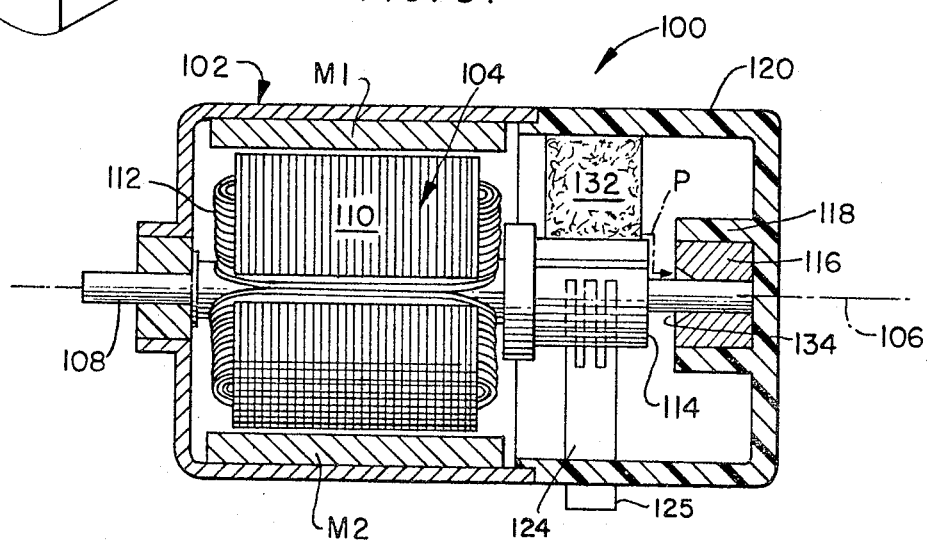
FIG. 3 is a side elevational view, in cross section, of an electric motor in accordance with the present invention.
Figure 2:
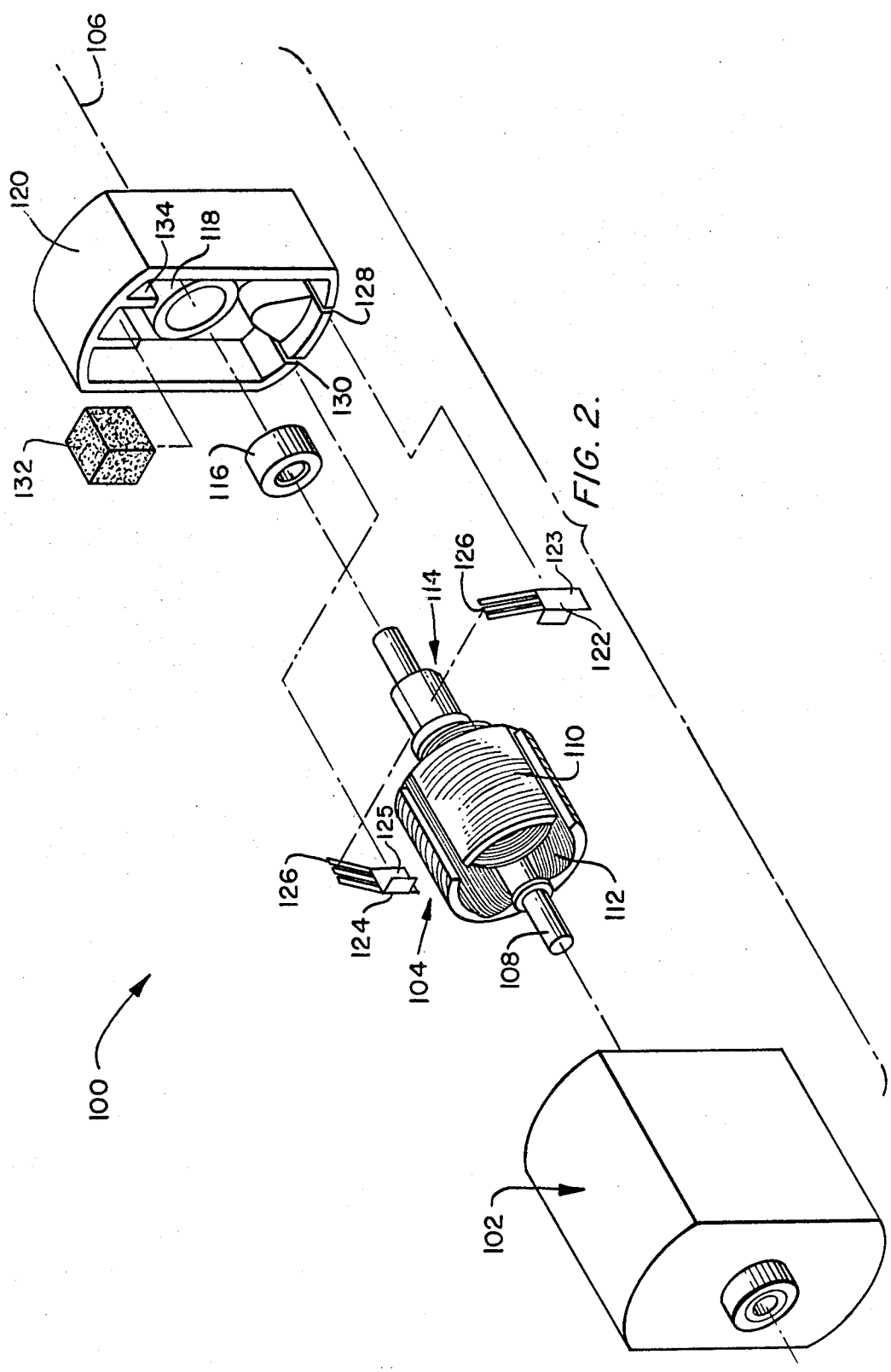
FIG. 2 is a partial exploded perspective view of a electric motor assembly in accordance with the present invention.

The aforementioned problems associated with the electric motor structure described above in FIG. 1 are overcome by a motor 100 in accordance with the present invention shown in partial exploded perspective in FIG. 2 and in elevational cross section view in FIG. 3.

The motor 100 includes a stator assembly 102 that includes first and second permanent field magnets M1 and M2 (FIG. 3) for establishing a field and a rotor assembly 104 that is mounted within the stator assembly 102 for rotation about a motor axis 106. The rotor assembly 104 includes a support shaft 108, a laminated armature stack 110, plural armature windings or coils 112 wound on the stack, and a commutator 114 connected to the armature coils 112. In the preferred embodiment, the rotor assembly 104 is a three pole rotor that includes three armature coils connected to three copper commutator bars.

The commutator end of the support shaft 108 is journalled in a plain bore plastic sleeve bearing 116 mounted in a suitable counterbored boss 118 formed in the motor end cap 120 which, with the stator assembly, forms the motor housing. In the alternative, the commutator end of the support shaft 108 can be journalled in a plain bore formed directly in the end cap 120. The end cap 120 is preferably a glass-filled polymer that is molded by injection molding techniques. A conventional impregnated bearing is employed at the opposite end of the armature.

Brushes 122 and 124 are provided to effect commutation with the commutator 114 with the brushes fabricated as an integral arm and contact from a resilient base metal such as one-quarter or one-half hard beryllium copper, phosphor bronze, or nickel silver. Brushes 122 and 124 are provided with plural tines or fingers 126 at their remote ends that effect direct contact with the commutator 114. The proximate ends of the brushes 122 and 124 are secured in respective brush-receiving slots 128 and 130 formed in the end cap 120. Terminal portions 123 and 125 of the brushes 122 and 124 extend through the end cap 120 to effect electrical connection to an external voltage source. By providing brushes 122 and 124 with plural contact fingers 126, the probability of maintaining commutation during periods of vibration is enhanced.

Figure 4:
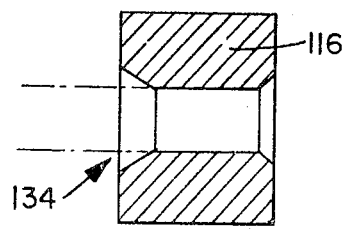
FIG. 4 is a side elevational view, in cross section, of a rotor shaft bearing employed in the present invention.

A wicking block 132, preferably fabricated from a fibrous felted material, is mounted in the motor end cap 120 between guides 134 and is designed to contact and apply a light pressure force against the commutator 114. The wicking block is impregnated with a supply of commutator enhancing lubricant, a synthetic non-organic lubricant which does not degrade to form a carbon chain under an electric field discharge, such as Ball Aerospace, Inc. lubricant P/N BASD 1569-P50. This lubricant is applied to the commutator 114 by the wicking block 132 and has the effect of both reducing the coefficient of friction and enhancing conduction between the contact fingers 126 of the brushes 122 and 124 and the commutator 114. The lubricant permits the brushes 122 and 124 including both the commutator contacts and the spring arm to be a single piece, made entirely of base metal to thereby dispense with the need for a separate precious metal contact. This, in turn, reduces the voltage drop in the brush while also reducing cost. The physical characteristics (viz., its vapor pressure or surface tension) of the commutation enhancing lubricant are controlled to provide migration along a surface, for example, from the commutator 114 along the rotor support shaft 108 into the plain bore bearing 116, while preventing its evaporation and redeposit on other motor portions. As shown in FIG. 4, the end of the bearing 116 facing the commutator 114 is countersunk or beveled, for example, at 45°, to form an entry way 134 for the commutator lubricant to encourage migration onto the bearing surface by capillary action.

In use, the commutator lubricant applied to the commutator 114 by the wicking block 132 enhances commutation, and through its migration to the plain bearing 116 in the end cap 120 provides an ample supply of bearing lubricant. Thus, when the electric motor is used as the drive motor in a film ejecting mechanism and the motor has not been used for a substantial period of time, the now beneficial migration of the commutator lubricant (along the path illustrated by the dotted line arrow P in FIG. 3) will provide adequate plain bearing lubrication and also enhance commutation so that on the first-use after a substantial period of inactivity, the motor 100 has a high probability of operating within its performance specifications. This is to be contrasted with prior art electric motors as described above in connection with FIG. 1 in which the undesired migration of the bearing oil in the opposite direction from the bearing to the commutator diminishes the supply of surface lubricant at the bearing and also contaminates the brush/commutator interface to cause out of specification operation.

While in the preferred embodiment illustrated herein the lubricant dispensing means (the wick 132) extends to the commutator, it should be understood that it need only supply lubricant to a point on the rotor adjacent the commutator, for example, to the bearing from which it can migrate along the rotor shaft to the commutator.

The invention, in addition to providing a highly reliable motor that exhibits in-specification first-use performance after substantial periods of non-use, also improves efficiency and reduces cost. The integral single element electrodes of base metal are not only more economical, but also of lower resistance that multi-element electrodes since interconnections are eliminated and, hence, provide a lower voltage drop which is vital for long life battery operation. Further, since the requirement to prevent migration of the bearing oil is obviated, the use of an oil slinger and the requirement for a sintered bronze bearing sleeve are eliminated thereby also providing an electric motor that is less expensive to manufacture than prior motors.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. An electric motor comprising in combination:
   a housing including means for establishing a stator field;
   an armature including a commutator and a rotor shaft;
   bearing means supporting said rotor shaft for rotation with respect to said stator;
   a brush arrangement comprising at least one brush including a terminal portion integrally formed of base metal resiliently biased into contact with said commutator; and
   means for providing a supply of synthetic non-organic commutator enhancing lubricant to the area of or adjoining said commutator to enhance commutation with said brush arrangement and thereby reduce the voltage drop from said terminal portion to said commutator.

2. The electric motor of claim 1 wherein said bearing means includes a plain bore journal defined by a sleeve bearing mounted in said housing adjacent said commutator, and said lubricant comprises a material having physical characteristics providing migration of said lubricant between said sleeve bearing and said commutator.

3. The electric motor of claim 2 wherein said sleeve bearing includes an entry chamber facing in the direction of said commutator to facilitate migration of said lubricant into said sleeve bearing.

4. An electric motor comprising in combination:
   a housing including stator means for establishing a stator field;
   a rotor including a rotor shaft carrying an armature and a commutator, said armature including an armature coil connected to said commutator;
   bearing means for supporting said rotor shaft for rotation including a plain bore journal located adjacent said commutator;
   a brush arrangement secured to said stator means and including at least two brushes resiliently biased into contact with said commutator; and
   means for providing a supply of synthetic, non-organic commutator enhancing lubricant to said motor at a point at least in adjoining relation to said commutator to enhance commutation and for causing said lubricant to migrate from said commutator along said rotor shaft toward and into said plain bore journal to lubricate said journal.

5. The electric motor of claim 4 wherein said plain bore journal is defined by a sleeve bearing mounted in said housing, said sleeve bearing including an entry chamber facing in the direction of the migrating commutation enhancing lubricant to facilitate migration thereof into said sleeve bearing.

6. An improved electric motor for driving the film unit eject mechanism of a self-developing photographic camera, the mechanism being of the type having a step-down gear train connected to pressure applying rollers between and through which an exposed film unit passes during ejection from the camera, said improved electric motor comprising:

stator means for establishing a stator field;

a rotor including a rotor shaft for connection to the film eject mechanism gear train, an armature and a commutator mounted on said rotor shaft, said armature including an armature coil connected to said commutator;

bearing means for supporting said rotor shaft for rotation including a plain bore journal located adjacent said commutator;

a brush arrangement comprising a pair of brushes including terminal portions integrally formed of base metal resiliently biased into contact with said commutator; and means for dispensing a synthetic, non-organic lubricant onto said commutator to enhance commutation thereby reducing the voltage drop from said terminal portion to said commutator and for causing said lubricant to migrate from said commutator along said rotor shaft toward and into said plain bore journal to lubricate said journal.

* * * * *